UNITED STATES PATENT OFFICE 2,453,674

ALKAMINE ESTERS OF PYRROLE SUBSTITUTED ACRYLIC ACIDS

Theodore F. Scholz, Plainfield, N. J., assignor to American Cyanamid Company, New York, N. Y., a corporation of Maine No Drawing. Application November 14, 1946, Serial No. 709,781

3 Claims. (Cl. 260—313)

This invention relates to alkamine esters of pyrrole substituted acrylic acids.

A number of alkyl esters of pyrrole substituted acrylic acids are known, but alkamine esters have never been prepared as they cannot be obtained by ordinary methods. It is with these esters that the present invention is concerned.

The esters of the present invention may be used in various fields such as activation of rubber accelerators, local anaesthetics and the like. In general the esters of the present invention are prepared by alcoholysis of the corresponding alkyl esters using an alkali metal alcoholate as the catalyst.

The alkyl esters which are the raw material from which the alkamine esters of the present invention are prepared may be obtained by various known means, the best method being from pyrrole aldehydes which are reacted with alkyl acid malonates, such as ethyl acid malonate, in the presence of a base such as a piperidine.

The alkamine esters of the present invention are obtainable in the form of the free bases or in the form of their salts, such as hydrochlorides. When used as local anaesthetics the latter form is preferred as it is in general more water soluble. The free bases, however, show greater effectiveness as activators for rubber accelerators.

The invention will be illustrated in greater detail in conjunction with the following specific examples which are typical illustrations. The parts are by weight and temperatures are uncorrected unless other specified.

Example 1

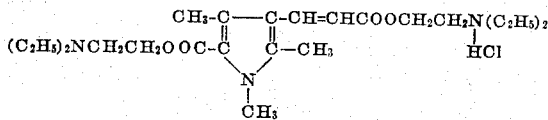

24 parts of diethyl-1,2,4-trimethylpyrrole-5-carboxylate-3-acrylate (prepared by reacting ethyl-1,2,4-trimethylpyrrole-5-carboxylate-3-aldehyde with ethyl acid malonate), are mixed with 107 parts of β-diethylaminoethanol to which a small amount of metallic sodium has been added. The solution is then heated at about the boiling point of water for some time and the temperature then increased to about 150–160° C., ethyl alcohol distilling over. When the vapor temperature rises the pressure is lowered to 10 mm. and the excess β-diethylaminoethanol distilled over.

A residue is obtained which is extracted with ether, the extract washed with brine, dried and a solution of dry hydrogen chloride in ether slowly added with stirring while chilling the reaction mixture. The addition of acid is stopped short of neutrality and the hydrochloride precipitate filtered off, washed with anhydrous ether and vacuum dried. It has a melting point of 235.4–238.2° C. (corr.). The compound is soluble in ethyl alcohol, chloroform and water, and insoluble in absolute ether.

The same compound is obtained when a corresponding amount of the dimethyl-1,2,4-trimethylpyrrole-5-carboxylate-3-acrylate is used instead of the corresponding diethyl ester. The reaction proceeds in the same manner except that the initial distillation temperature is that corresponding to methyl alcohol instead of ethyl alcohol.

Example 2

The procedure of Example 1 is followed but the β-diethylaminoethanol is replaced by a corresponding amount of β-diethylominopropanol. The product obtained has substantially the same properties as that of Example 1.

Example 3

The procedure of Example 1 is followed but the β-diethylaminoethanol is replaced by a corresponding amount of β-dimethylaminoethanol. The product obtained has substantially the same properties as that of Example 1.

Example 4

The procedure of Example 1 is followed but the β-diethylaminoethanol is replaced by a corresponding amount of γ-dipropylaminopropanol. The product obtained has substantially the same properties as that of Example 1.

In the foregoing examples the catalyst sodium is added to the dialkylamino alkanol where it, of course, reacts to produce the alcoholate. The addition of the sodium is in no sense critical. It may be added to the reaction mixture, or it may be reacted either with the amino alcohol or with ordinary ethyl alcohol to form an alcoholate and the ready formed alcoholate added to the reaction mixture. The relative insensitiveness of the reaction to the method of addition of the sodium alcoholate and the smoothness of the reaction is in marked contrast to the ordinary characteristics of amino alcohols and their esters, which usually are sensitive to oxidation in alkaline solution. No reason is advanced here why the present reaction proceeds readily in spite of this normal tendency to side reactions.

The amount of alkali metal alcoholate present is not critical, but it should be in catalytic amounts, that is to say, amounts which are sufficient to vigorously catalyze the reaction but far below stoichiometric proportions. Good results are obtained with amounts of alcoholate of the order of $\frac{1}{10}$ mole per mole of the dicarbalkoxypyrrole. This proportion is not critical and the term "catalytic amounts" will be used in the claims in its ordinary sense of small amounts far below stoichiometric proportions. Sodium can be replaced by potassium, but this presents no advantage in the reaction and, therefore, does not economically warrant the higher cost of potassium. For this economic reason the sodium alcoholate is preferred as the catalyst.

In many of the examples the hydrochlorides of the products are described. These salts are most readily prepared and where the product is of utility as a local anaesthetic are preferred because they are readily soluble in water. The esters, however, are capable of reacting with other strong acids to produce the corresponding salts.

This application is in part a continuation of my copending application Serial No. 496,956, filed July 31, 1943 now abandoned.

I claim:

1. Compounds selected from the group consisting of esters of 1,2,4-trimethylpyrrole-5-carboxy-3-acrylic acid with dialkylamino alkanols and addition salts of the esters with strong acids.

2. Di($\beta$-diethylaminoethyl)-1,2,4-trimethylpyrrole-5-carboxylate-3-acrylate having the formula:

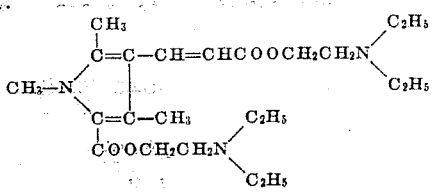

3. A method of preparing bis(dialkylaminoalkyl) esters of 1,2,4-trimethylpyrrole-5-carboxylic acid-3-acrylic acid which comprise heating the dialkyl ester of the pyrrole carboxylic acrylic acid with the desired dialkylamino alkanol in the presence of catalytic amounts of an alkali metal alcoholate.

THEODORE F. SCHOLZ.

No references cited.